May 19, 1964
T. D. KIDD
3,133,626
CONVEYOR-SUPPORTING IDLER ASSEMBLY
Filed Feb. 28, 1961
4 Sheets-Sheet 1
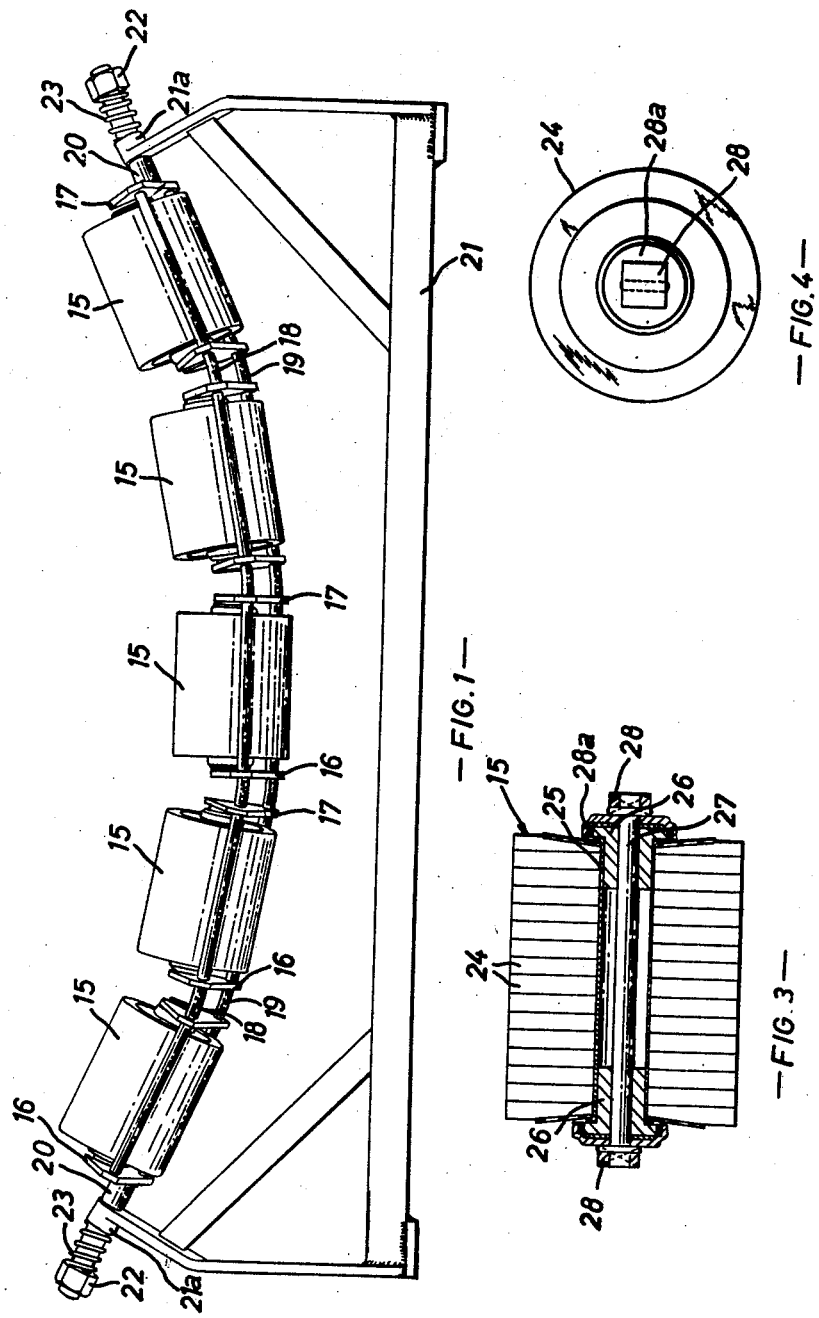
INVENTOR:
THOMAS DARGUE KIDD
BY
Mead, Browne, Schuyler + Beveridge
ATTORNEYS

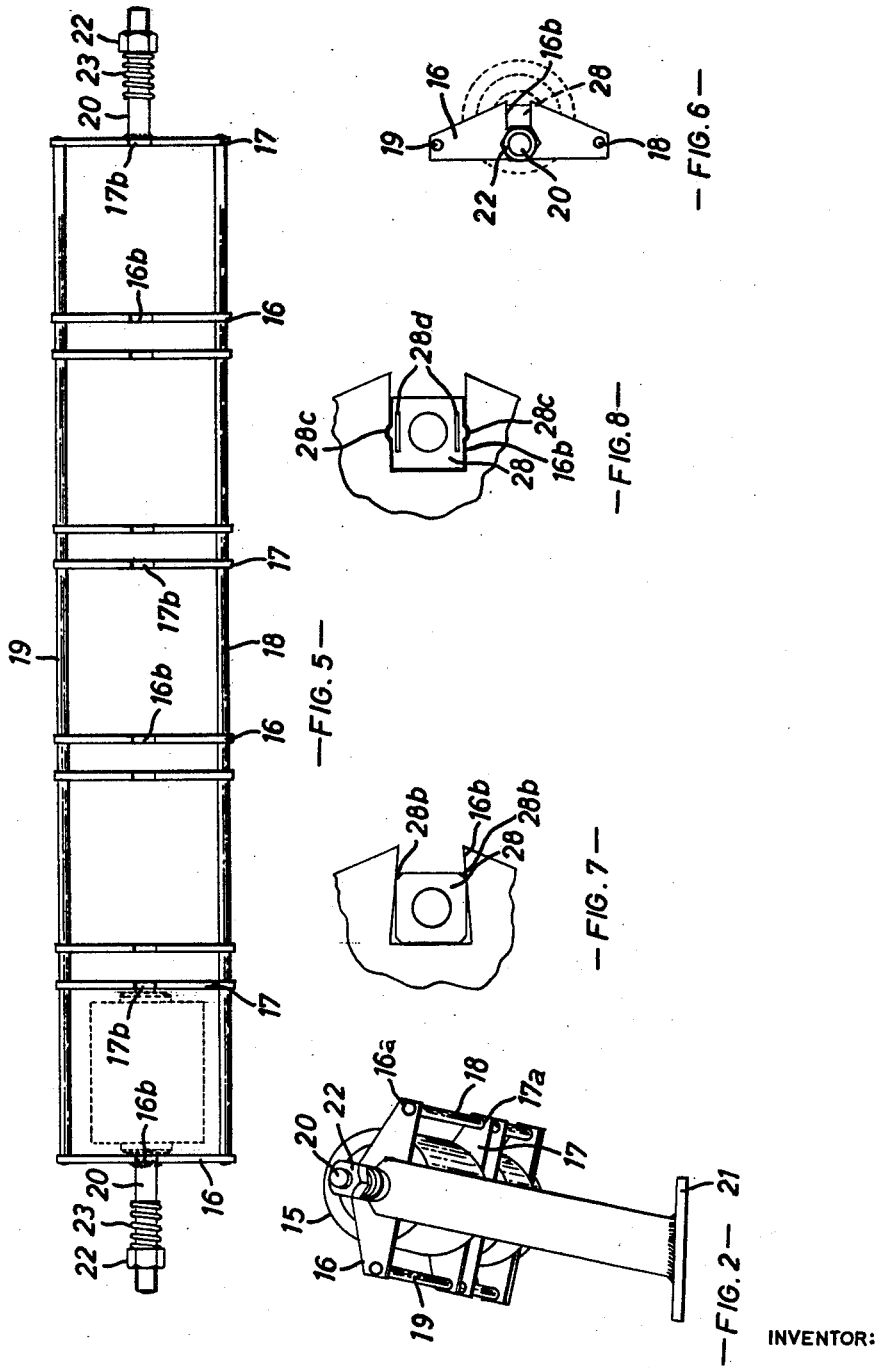

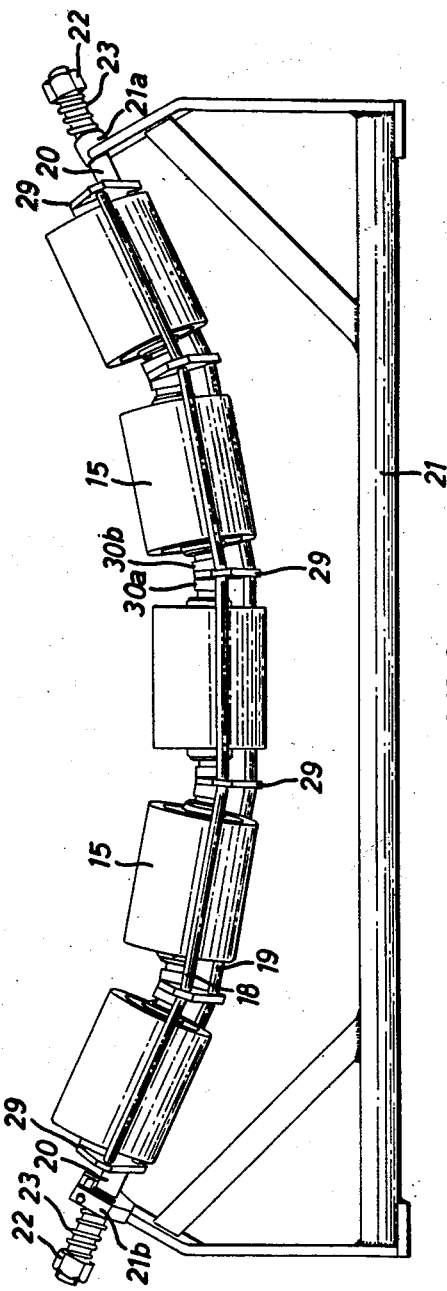

May 19, 1964  T. D. KIDD  3,133,626
CONVEYOR-SUPPORTING IDLER ASSEMBLY
Filed Feb. 28, 1961  4 Sheets-Sheet 4
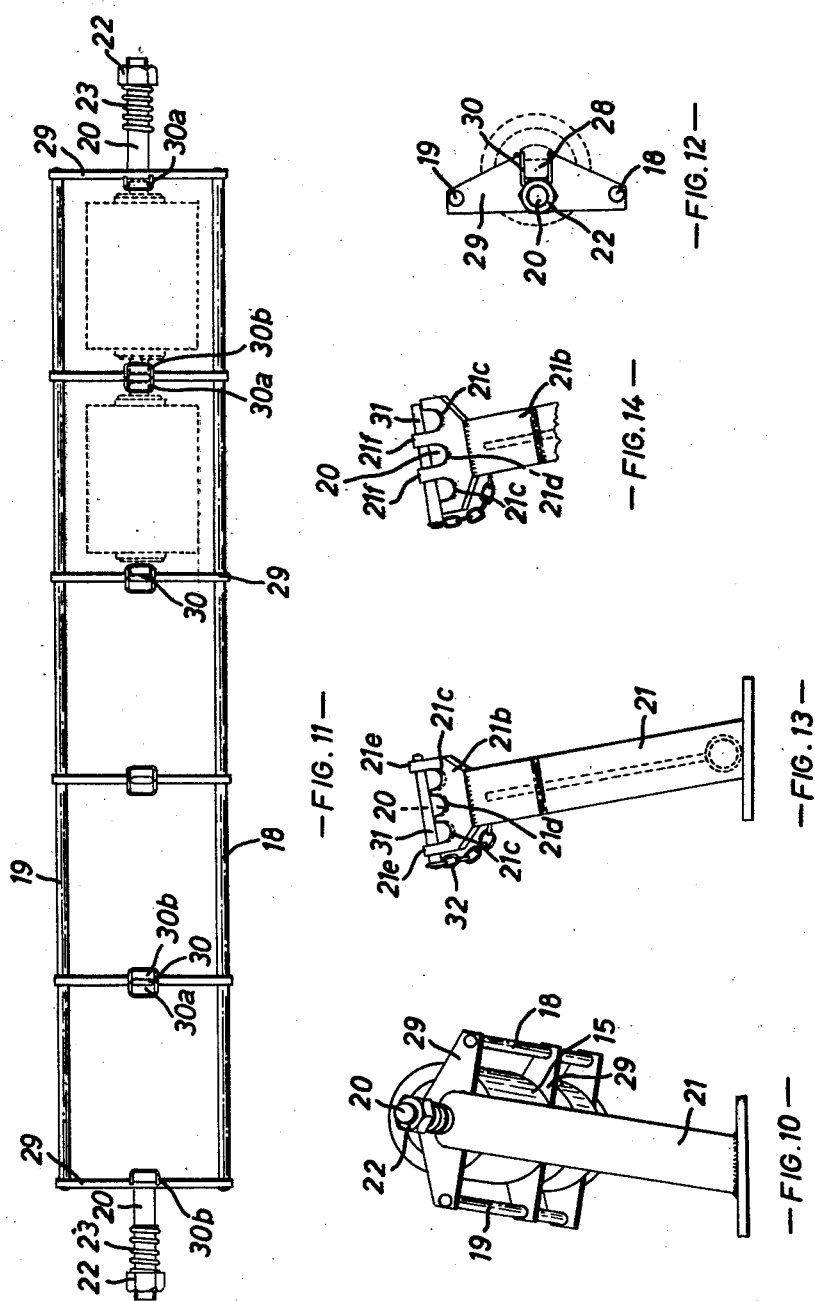
INVENTOR:
THOMAS DARGUE KIDD
BY
Mead, Browne, Schuyler & Beveridge
ATTORNEYS United States Patent Office
3,133,626
Patented May 19, 1964

3,133,626
CONVEYOR-SUPPORTING IDLER ASSEMBLY
Thomas Dargue Kidd, 189 Oxbridge Lane,
Stockton-on-Tees, England
Filed Feb. 28, 1961, Ser. No. 92,336
Claims priority, application Great Britain Mar. 3, 1960
11 Claims. (Cl. 198—192)

This invention relates to a conveyor-supporting idler assembly. In such an assembly, the idlers or rollers are arranged to support an endless conveyor belt in troughed configuration in such a way that the degree of troughing is varied by the load carried by the belt.

The invention provides a conveyor-supporting idler assembly in which a series of transversely spaced and transversely interconnected roller-supporting brackets is resiliently supported at its opposite ends and the brackets of the series, or certain of them are interconnected in a flexible or pivotal manner to enable them automatically to change their relative inclination on movement of the endmost brackets of the series towards or away from one another on variation in the degree of troughing.

Each roller may be rotatably supported at its opposite ends in adjacent brackets, the series of brackets being supported through spring means by a transverse frame.

Adjacent brackets may be interconnected at longitudinally spaced localities so as to offer resistance to relative angular displacement of the brackets about the axis of rotation of the rollers. For example, the brackets may be mounted on and interconnected by a pair of parallel wire ropes or a substantially horizontal flexible flat strip or the brackets may be interconnected by pairs of parallel links. Parallel wire ropes are preferred.

Pairs of adjacent brackets may be rigidly connected to one another and pivotally or flexibility connected to adjacent rigidly connected pairs of brackets.

Preferably, the brackets of each adjacent pair may be spaced apart by a distance sufficient to accommodate a roller and formed with bearings adapted to support the adjacent ends of adjacent rollers. Thus, each bracket supports the ends of two different rollers and it will be appreciated that the support must be such as to allow for the variation in troughing of the assembly.

The bearings may therefore take the form of slots or recesses in the brackets, each roller being rotatably mounted on a shaft or shafts, the ends of which are shaped to engage in the slots or recesses so as to prevent rotation of the shaft or shafts and permit variation in the inclination of the shaft or shafts to the brackets.

Alternatively, the brackets may be arranged in pairs, each pair of brackets being spaced from an adjacent pair of brackets by a distance sufficient to accommodate a roller and each bracket of each pair being formed with a bearing adapted to support one end of a roller.

In this alternative form of construction, the bearings may take the form of slots or recesses in the brackets, each roller being rotatably mounted on a shaft or shafts, the ends of which are shaped to engage in the slots or recesses so as to prevent rotation of the shaft or shafts. In this construction it is not necessary for the shaft ends to permit variation in the inclination of the shaft or shafts to the brackets because each bracket supports only one end of a roller shaft.

Furthermore, the shaft ends may be made of a resilient deformable material and may be arranged to be a snap or wedge fit in the slots or recesses as opposed to a mere gravity fit. While a gravity fit is generally satisfactory, there is sometimes a tendency for the roller shafts to be lifted out of their bearings when the conveyor belt is running over the rollers. The use of a snap or wedge fit prevents this.

Each roller may take the form of a series of disks mounted on a hollow core having self-lubricating bearings fitted in the ends thereof, the bearings being rotatable upon said shaft or shafts. The disks may be mounted in contact to provide a cylindrical roller or may be spaced on the core to provide a series of rims serving as a roller. In either case, the disks may be held on the core by clinching the disks between the ends of the core.

Each of the endmost brackets of the series may be supported by a rod or bar mounted in the transverse frame, the rods or bars being arranged to be axially slidable towards one another on compression of a spring or springs. At least one side of the frame may be provided with a plurality of longitudinally disposed mountings for the rod or bar to allow for tracking of the conveyor. The mountings may take the form of slots in the frame, in one of which the rod or bar is slidably supported and a retaining member may be arranged to be movable into a position in which it retains the rod or bar in the slot.

The invention will now be further described with reference to the accompanying drawings in which FIG. 1 is a side view of a conveyor-supporting idler assembly, FIG. 2 is an end view corresponding to FIG. 1, FIG. 3 is a section on an enlarged scale of one of the rollers shown in FIG. 1, FIG. 4 is an end view of the roller shown in FIG. 3, FIG. 5 is a plan view of the interconnected brackets shown in FIG. 1, FIG. 6 is an end view corresponding to FIG. 5, Each of FIGS. 7 and 8 is a fragmentary view corresponding to FIG. 6 and illustrating a modified roller support, FIG. 9 is a side view of an assembly alternative to that shown in FIG. 1, FIG. 10 is an end view corresponding to FIG. 9, FIG. 11 is a plan view of the interconnected brackets shown in FIG. 9, FIG. 12 is an end view corresponding to FIG. 11, FIG. 13 is an end view of the frame shown in FIG. 9, the end being opposite to that shown in FIG. 10, and FIG. 14 is a fragmentary view corresponding to FIG. 13 and showing a modification thereof.

In the drawings like numbers refer to like parts.

Referring to FIGS. 1 and 2, each roller 15 is rotatably mounted between brackets 16, 17 which are interconnected by parallel wire ropes 18, 19. The wire ropes pass through the holes 16a, 17a in the brackets and have been locked in these holes by clinching of the brackets to reduce the size of the holes and thus to compress the ropes therein. The endmost brackets 16 and 17 carry rods 20, each of which is slidable in a collar 21a which is carried by a transverse frame member 21. A nut 22 is threaded upon the free end of each of rods 20 and a coiled spring 23 is concentrically disposed on rod 20 between nut 22 and collar 21a, the ends of the spring abutting the nut and the collar. Thus the spring may be compressed between the nut and the collar by an amount depending on the loading of the rollers 15 by the conveyor belt which they support and depending also on the compression resistance of the spring.

Referring to FIGS. 3 and 4, each roller consists of a plurality of contiguous fibre disks 24 mounted upon and clinched between the ends of a core 25 in the ends of which are fitted graphited nylon bearings 26, the bearings being rotatably mounted upon a shaft 27 to the ends of which are pinned rectangular end members 28 also of graphited nylon. The end members 28 carry caps 28a which protect the ends of the bearings 26.

Referring to FIGS. 5 and 6, brackets 16 and 17 are provided with rectangular slots 16b, 17b, which serve as bearings for the roller ends. The roller ends 28 are a gravity fit in the slots 16b, 17b and in FIG. 6 a roller end member 28 is shown (in dotted lines) positioned in the slot 16b. The shape of the end member 28 is such that it engages with slot 16b to prevent rotation of the shaft 27. A roller 15 is shown in dotted lines in FIG. 5 so as to indicate more clearly than in FIG. 1 the way in which the rollers are supported by the brackets.

In FIG. 7 the slot 16b is of dove-tail shape and the roller end member 28 is a wedge fit in the slot. Because it is made of a resilient material the end member 28 may be forced into the slot 16b and to facilitate this, end member 28 may be chamfered at 28b. It will be apparent that the shape of the slot prevents lifting of the roller shafts out of their bearings when the conveyor belt is running over the rollers.

In FIG. 8 the slot 16b is rectangular but is provided with grooves 16c in which ribs 28c on the roller end member 28 engage. The end member 28 is a snap fit in the slot 16b and to facilitate fitting, the end member 28 is provided with internal slots 28d. Here again lifting of the end member from the slot by the conveyor belt is prevented. It will be appreciated that since both ends of the rollers 15 are supported in slots, the end members 28 cannot be withdrawn from the slots by sliding.

The structures shown in FIGS. 9, 10, 11 and 12 differ from those shown in FIGS. 1, 2, 5 and 6 respectively in that the brackets 16 and 17 are replaced by brackets 29 and one of the collars 21a is replaced by a longitudinally slotted mounting 21b which is also shown in FIG. 13. Each bracket 29, other than the endmost brackets, is provided with a slot in which a support member 30 is recessed. Each support member 30 supports the end members 28 of two different but adjacent rollers in mutually inclined portions 30a, 30b, of the support member 30. The endmost brackets 29 are provided with slots in which support members 30a, 30b respectively are recessed to support the outer end members 28 of the endmost rollers 15. The end members 28 are preferably as shown in FIGS. 3 and 4 in order to permit variation in the inclination of the shaft 27 to the brackets 29. A member 28 is shown in dotted lines in FIG. 12 to indicate the manner in which the end member fits in the support member 30. The shape of the end member 28 is such that it engages with the support 30 to prevent rotation of the shaft 27. Two rollers 15 are shown in dotted lines in FIG. 11 so as to indicate more clearly than in FIG. 9 the way in which the rollers are supported by the brackets.

The mounting 21b is provided with slots 21c and 21d. In FIG. 9 and also in dotted lines in FIG. 13, the rod 20 is shown slidably supported in the slot 21d but it may also be supported in either of the slots 21c. A pin 31 which is attached by a retaining chain 32 to the transverse mounting 21 and is pushed through holes in the lugs 21e of the mounting 21b to retain the rod 20 in the slot 21d.

The modification shown in FIG. 14 differs from that of FIG. 13 in that the pin 31 passes through holes in the lugs 21f of the mounting 21b disposed on either side of slot 21d.

It will be appreciated that in the foregoing description, the terms "longitudinally" and "transversely" refer to the length and breadth directions respectively of a conveyor belt supported upon the idler assembly.

It will be apparent from the above description of the drawings that the troughed configuration can be set initially to form a predetermined belt catenary when the belt is running unloaded on the rollers 15 or only lightly loaded, and the depth of the troughed configuration under full load can also be predetermined to provide any belt catenary, according to the distance between the supports for the rods 20 and according to the strength and adjustment of the compression springs 23, adjustment being effected by turning nuts 22. Thus when the belt is unloaded or only lightly loaded it is maintained at the particular catenary desired, but as the load on the belt is increased the flexibility of the wire ropes 18, 19 allows the depth of the troughed configuration of the belt to increase correspondingly to follow the natural catenary of a more heavily loaded belt, as is desirable to prevent lateral spillage of the material over the edges of the belt.

A flexible variation in the troughed configuration according to the load is desirable, not only to provide maximum carrying capacity of the belt and to prevent spillage of material, but also because the resilience of the assembly as shown in FIG. 1 or FIG. 9 provides shock absorbence to eliminate the impact and bumping of lumpy material carried by the belt, thus prolonging belt life and preventing damage and breakage of the material being carried. The variation of the troughed configuration also assists considerably in maintaining belt alignment especially on long conveyors, and the continual variation prevents builds up of damp, sticky materials on the underside of the belt or on the belt supporting rollers 15, all of which desirable properties assist considerably in prolonging the life of the conveyor belt.

The present invention, as described with reference to the drawings, thus provides a flexible conveyor roller assembly for supporting in troughed configuration the load carrying run of a conveyor belt. This assembly is of a particularly strong and trouble-free construction in-as-much as the rollers 15, which are comparatively long and stable, revolve on rigid stationary spindles 27, as in conventional conveyor practice, and the desired resilience is provided by the flexing in one plane of the cradle formed by the wire ropes 18, 19, which are not subjected to any unusual stress, strain or wear.

Furthermore, the constructions described in the drawings possess an additional important advantage in that they reduce to a minimum the forward movement of the centrally disposed rollers 15 which can occur for example if the rollers are rotatably mounted on and carried by a flexible shaft and which increases the initial power required to start the movement of a loaded belt, which in a long installation may necessitate the provision of a substantially larger power unit than is necessary when this forward movement of the roller elements is markedly reduced as in the present invention.

It will be apparent that this tendency to forward movement evident in some flexible constructions is prevented in the present invention because, as the two wire ropes 18, 19 forming the cradle are disposed in a substantially horizontal plane, they are constrained from moving in this plane by reason of the fact that they are interconnected in this plane by the brackets 16 and 17 or 29. However, as they are disposed in a horizontal plane and so constrained in that plane, it will be apparent that they are not constrained in a perpendicular plane and in fact are free to flex in that plane.

The above form of flexible mounting, whilst it is applicable to other conventional conveyor rollers having a rigid spindle, is particularly adapted for the form of roller construction shown in FIGS. 3 and 4 of the drawings, the rollers being all made identical in size regardless of the width of the belt which it is desired to support and the number of rollers being determined according to the belt width. For example, for a 30" wide conveyor belt five rollers of that type 4" diameter x 5¼" long would be flexibly mounted in the manner described above with reference to the drawings, thus providing the desirable features of flexibility with standardisation and interchangeability of all rollers regardless of the size of conveyor together with ease of fitting or removal of any one roller.

As an alternative to using the wire ropes 18, 19 to form the flexible cradle, it will be apparent that other materials having sufficient strength and flexibility may be used. For example, ropes of a synthetic material such as terylene or nylon; or as another alternative spring steel rods, could be used.

In the drawings the material of the brackets is described as being clinched to grip the ropes. It will be apparent that any other desired means may be provided for attaching the brackets to the flexible member or members interconnecting them e.g. they could be located by suitable collars fastened to the flexible members by means of screws or pins.

As an alternative to flexible ropes, more than two of which may be used if desired, the flexible cradle may be provided by a single relatively wide band or strip of flexible material such as spring steel or a strip of fibre-reinforced elastomeric material, such as conveyor or other belting. Alternatively two or more strips of relatively narrower material may be provided.

It is customary in order to correct mis-tracking of the belt to provide a means of obtaining some adjustment of the angular position of the centre line of the idler sets in relation to the longitudinal centre line of the belt. For example, if the belt has a tendency to run towards one side of the idler sets these may be angularly adjusted so that the rollers cause the belt to assume a central tracking position.

It will be apparent that this adjustment may be a matter of some considerable difficulty especially in the cramped conditions usual in coal or other mines. Also, the amount of adjustment which can be obtained on each frame may be comparatively small, and so in order to correct misalignment of the belt it may be necessary to adjust the position of a considerable number of troughing idler sets on an installation to produce the desired centralising effect on the conveyor belt.

The means shown in FIG. 13 of the drawings enable the position of the axis of the belt supporting rollers to be adjusted in a very simple and convenient way.

Instead of both the rods 20 being permanently located in collars 21a of the frame 21 as in FIG. 1, both, or as in FIG. 9 preferably one only, of the rods is so mounted that it can be located in any one of three positions defined by the slot 21d and the two slots 21c according to the way in which it is desired to adjust the tracking of the belt. Additional slots 21c may be provided to give more than three such positions. The slot 21d is centrally disposed in mounting 21b to give correct location to the rod 20 so that the centre line of the idler assembly is then at 90 deg. to the longitudinal centre line of the conveyor belt for normal running. The two or more slots 21c are positioned at either side of the centrally disposed slot 21d so that the rod 20 may be moved from the centre position and in this way the end of the idler assembly is thereby moved to a position forward or backward of the centre position thus providing the desired alteration to track the belt correctly, if its tendency has been to run to one side or other of the troughing idlers.

The distance between the slots is arranged to give the desired amount of adjustability. For example, a slot at each side of the centrally disposed slot may be positioned so that its pitch is 1¼" from the centre slot, thus providing a total adjustment of 2½" on the location of the rod 20.

In order to retain the rod 20 in the appropriate slot without any danger of it jumping out of position under shock loading, the depth of the slots is arranged so that they extend above the top of the rod 20 by an amount sufficient to accommodate the pin 31. While this pin may be of any suitable type having means to prevent its accidental removal, it is preferably a taper pin which as shown is located in the holes in the lugs 21e or 21f by the customary wedging action thus enabling the pin to be easily fitted or removed by means of a hammer or other suitable tool. The purpose of the retaining chain 32, attached to the larger end of the pin 31 is to prevent the pin from becoming lost when it is removed from its locating hole or holes.

It will be apparent that it is possible to use other types of pin having suitable locking means. For example, a split pin of suitable diameter and length may be positioned in the hole or holes and its end opened in the usual way. Alternatively, a solid parallel pin may be used having a cross drilled hole for a small securing split pin. In yet another alternative, the pin may be of tubular spring steel and is retained in its correct position by frictional grip in the hole. Alternatively, it could be a bolt positioned in a suitably threaded hole in the lugs, or positioned by a nut.

The construction shown in FIG. 13 may be regarded as having a single upwardly extending slot of a depth as before described but having a width equal to the total amount of adjustment required. The bottom of this slot or aperture may be regarded as grooved to form different locating positions for the rod 20, which is retained in position by the pin 31. In this way it is possible to have more locating positions, and therefore a finer degree of adjustability in an equivalent maximum adjustment, than is possible when separate slot-like locations are provided as in FIG. 14. The grooves may be formed by machining, indenting, or by any other means which will produce the necessary raised portions of material to provide the divisions between the different locating positions. The edges of these grooves together with the pin provide sufficient abutment for the spring 23.

It will be appreciated that the above provides a very simple and effective means of adjusting the idler sets for belt tracking purposes, enabling forward or backward throw of the idler sets to be obtained by movement from one side only of the conveyor. As a relatively large amount of adjustment is obtainable on each idler set it is only necessary, for belt tracking purposes, to alter the position of a comparatively few idler sets on a conveyor installation.

I claim:

1. An idler assembly for a conveyor comprising a frame having two mountings spaced apart thereon, a pair of parallel wire ropes extending between said mountings, brackets spaced apart in series between said mountings, each bracket spanning said pair of ropes and being fixedly mounted on said ropes with the ends of said ropes being connected to the endmost brackets, roller shafts spaced apart in series between said mountings and supported in said brackets, rollers rotatably mounted on said shafts, each adjacent pair of brackets being spaced apart by a distance sufficient to accommodate a roller therebetween, said roller shafts having square cut resilient end members which engage correspondingly square cut slots in said brackets so as to prevent rotation of the shafts and said resilient end members enabling the shafts to vary inclination with respect to said brackets, and the endmost brackets of the series being resiliently connected respectively to said mountings to permit variable troughing of said ropes.

2. An idler assembly as claimed in claim 1 in which each roller comprises a hollow core, disks mounted in series on and clinched between the ends of said hollow core and self-lubricating bearings fitted in the ends of said hollow core, said bearings being rotatable on said shafts.

3. An idler assembly for a conveyor comprising a frame having two mountings spaced apart thereon, a pair of parallel wire ropes extending between said mountings, brackets spaced apart in series between said mountings, each bracket spanning said pair of ropes and being fixedly mounted on said ropes with the ends of said ropes being connected to the endmost brackets, roller shafts spaced apart in series between said mountings and supported in said brackets and rollers rotatably mounted on said shafts, the brackets being arranged in pairs, each pair of brackets being spaced from an adjacent pair of brackets by a distance sufficient to accommodate a roller, each bracket of each pair being formed with a square cut slot supporting one end of one of said shafts, the ends of the shafts having correspondingly square cut resilient end members to engage in the slots so as to prevent rotation of the shafts and said resilient end members enabling the shafts to vary in inclination with respect to said brackets, and the endmost brackets of the series being resiliently connected respectively to said mountings to permit variable troughing of said ropes.

4. An idler assembly as claimed in claim 3 in which each roller comprises a hollow core, disks mounted in series on and clinched between the ends of said hollow core and self-lubricating bearings fitted in the ends of said hollow core, said bearings being rotatable on said shafts.

5. An idler assembly as claimed in claim 3 in which the shaft end members are made of a resilient deformable material and are arranged to be a snap fit in the slots.

6. An idler assembly as claimed in claim 3 in which one of said mountings has a series of slots located therein and one of said rods being selectively slidable in any one of said slots.

7. An idler assembly for a conveyor comprising a frame having two mountings spaced apart thereon, a pair of parallel wire ropes extending between said mountings, brackets spaced apart in series between said mountings, each bracket spanning said pair of ropes and being fixedly mounted on said ropes with the ends of said ropes being connected to the endmost brackets, roller shafts spaced apart in series between said mountings and supported in said brackets and rollers rotatably mounted on said shafts, the brackets of each adjacent pair being spaced apart by a distance sufficient to accommodate a roller therebetween, said roller shafts having square cut resilient end members which engage correspondingly square cut slots in said brackets so as to prevent rotation of the shafts and said resilient end members enabling the shafts to vary in inclination with respect to said brackets, rods attached to the endmost brackets of the series, said rods being slidable in said mountings in the direction of said ropes, and springs carried by said rods and abutting said mountings, said springs being arranged to resist sliding of said rods to bring said endmost brackets closer together.

8. An idler assembly for a conveyor comprising a frame having two mountings spaced apart thereon, a pair of parallel wire ropes extending between said mountings, brackets spaced apart in series between said mountings, each bracket spanning said pair of ropes and being fixedly mounted on said ropes with the ends of said ropes being connected to the endmost brackets, roller shafts spaced apart in series between said mountings and supported in said brackets, and rollers rotatably mounted on said shafts, the brackets being arranged in pairs, each pair of brackets being spaced from an adjacent pair of brackets by a distance sufficient to accommodate a roller, each bracket of each pair being formed with a square cut slot supporting one end of one of said shafts, the ends of the shafts having correspondingly square cut resilient end members to engage in the slots so as to prevent rotation of the shafts and said resilient end members enabling the shafts to vary in inclination with respect to said brackets, rods attached to the endmost brackets of the series, said rods being slidable in said mountings in the direction of said ropes, and springs carried by said rods and abutting said mountings, said springs being arranged to resist sliding of said rods to bring said endmost brackets closer together.

9. An idler assembly as claimed in claim 8 in which a retaining member is arranged in a position in which it retains the rod in the slot.

10. An idler assembly for a conveyor comprising a frame having two mountings spaced apart thereon, a pair of parallel ropes extending between said mountings, single brackets spaced apart in series between said mountings, each bracket spanning said pair of ropes and being fixedly mounted on said ropes, roller shafts having square cut resilient end members spaced apart in series between said mountings, each bracket being spaced apart from an adjacent bracket by a distance sufficient to accommodate a roller therebetween and having a square cut slot to receive said end members of two different but adjacent rollers so as to prevent rotation of said shafts and said resilient end members enabling the shafts to incline with respect to said brackets, and the endmost brackets of the series being resiliently connected respectively to said mountings to permit variable troughing of said ropes.

11. An idler assembly for a conveyor comprising a frame having two mountings spaced apart thereon, a pair of parallel ropes extending between said mountings, single brackets spaced apart in series between said mountings, each bracket spanning said pair of ropes and being fixedly mounted on said ropes, roller shafts having square cut end members spaced apart in series between said mountings, each bracket being spaced apart from an adjacent bracket by a distance sufficient to accommodate a roller therebetween and having square cut slot support members receiving said end members of two different but adjacent rollers in a loose horizontal fit so as to prevent rotation of said shafts and to enable the shafts to incline with respect to said brackets, and the endmost brackets of the series being resiliently connected respectively to said mountings to permit variable troughing of said ropes.

References Cited in the file of this patent

UNITED STATES PATENTS

| | | |
|---|---|---|
| 909,833 | Vrooman | Jan. 12, 1909 |
| 1,088,644 | Willson | Feb. 24, 1914 |
| 2,169,624 | Weiss et al. | Aug. 15, 1939 |
| 2,843,432 | Kindig | July 15, 1958 |
| 2,880,851 | Salmons | Apr. 7, 1959 |
| 2,889,918 | Bergmann | June 9, 1959 |

FOREIGN PATENTS

| | | |
|---|---|---|
| 111,443 | Sweden | Aug. 8, 1944 |
| 215,680 | Australia | Apr. 18, 1957 |